United States Patent Office.

COMMODORE PERRY SMALLRIDGE, SR., OF CATLETTSBURG, KENTUCKY.

TAWING HIDES.

SPECIFICATION forming part of Letters Patent No. 281,411, dated July 17, 1883.

Application filed October 23, 1882. (No specimens.)

*To all whom it may concern:*

Be it known that I, COMMODORE PERRY SMALLRIDGE, Sr., a citizen of the United States, residing near Catlettsburg, in the county of Boyd and State of Kentucky, have invented certain new and useful Improvements in Tawing Hides; and I do declare the following to be a full, clear, and exact description of the invention, such as will enable others skilled in the art to which it appertains to make and use the same.

This invention pertains to an improved tawing process for leather, and has for its object to impart elasticity, durability, and softness, as well as beauty of texture, to the leather; and the nature of my invention consists in liming the hides by subjecting them to the action of lime, concentrated lye, salt, and borax, to remove the hair, then bating them in a solution of hen-manure, sulphate of zinc, and borax, and finally, after removing them from the bate, placing them in a solution of water, buttermilk, borax, sulphuric acid, sulphate of zinc, saltpeter, and salt, substantially as hereinafter more fully set forth.

In carrying out my invention, I lime the hides, as already stated, to remove the hair, exposing them to the action of a solution consisting of the following ingredients, and in the proportions specified, to wit: eight (8) gallons of water, two (2) gallons of fresh-sifted lime, one-fourth (¼) of a pound of concentrated lye, one (1) pint of salt, and two (2) ounces of borax. I next remove them from said solution and place them in a bating solution consisting of sixteen (16) gallons of water, two (2) gallons of hen-manure, and three (3) ounces of dissolved borax. I then remove them from the bating solution and place them in a solution consisting of eight (8) gallons of water, two (2) gallons of buttermilk, two (2) ounces of dissolved borax, three (3) ounces of sulphuric acid, two (2) ounces of sulphate of zinc, one (1) quart of salt, and one (1) ounce of saltpeter. When this latter solution has struck entirely through the hides, they are taken out and the liquor pressed and worked out.

The solution should be strengthened from time to time after use, which can be done by any experienced tanner, as circumstances may require.

I wish it to be understood that I do not limit myself to the exact proportions hereinbefore specified in compounding the solutions, as it is evident that they may be varied somewhat without departing from the principle or sacrificing the advantages of my invention. This treatment of the hides effects the tanning thereof in such a manner as to impart to the leather elasticity, durability, and softness, as well as beauty of texture.

I claim and desire to secure by Letters Patent—

The process of tawing hides, after having subjected them first to a depilating bath of water, lime, concentrated lye, salt, and borax, and then to a bating-bath of water, hen-manure, and borax, by subjecting them to the action of a solution of water, buttermilk, borax, sulphuric acid, sulphate of zinc, and saltpeter, as and for the purpose set forth.

In testimony whereof I affix my signature in presence of two witnesses.

COMMODORE PERRY SMALLRIDGE, SR.

Witnesses:
 R. C. BURNS,
 JAMES CAMPBELL.